UNITED STATES PATENT OFFICE.

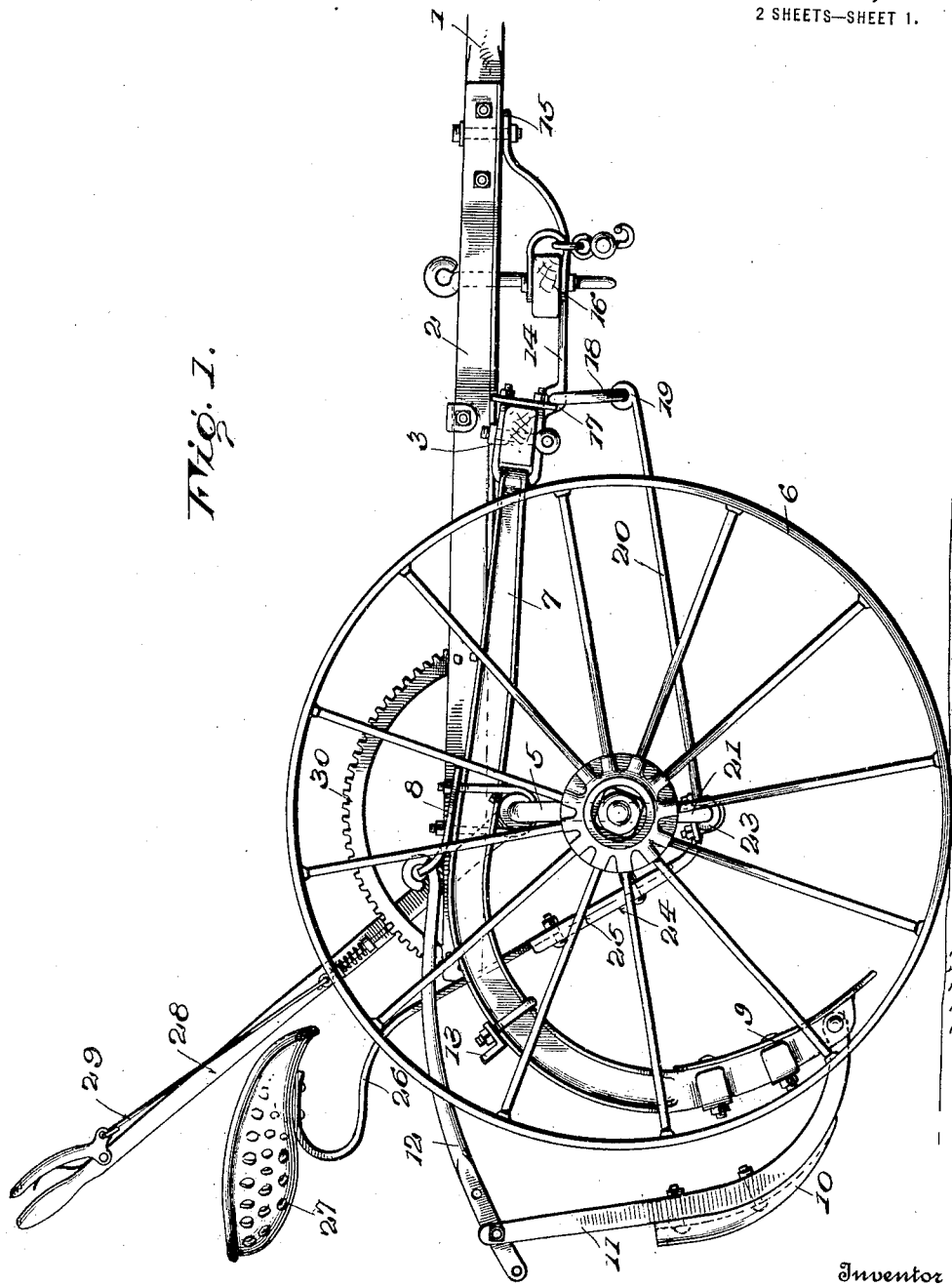

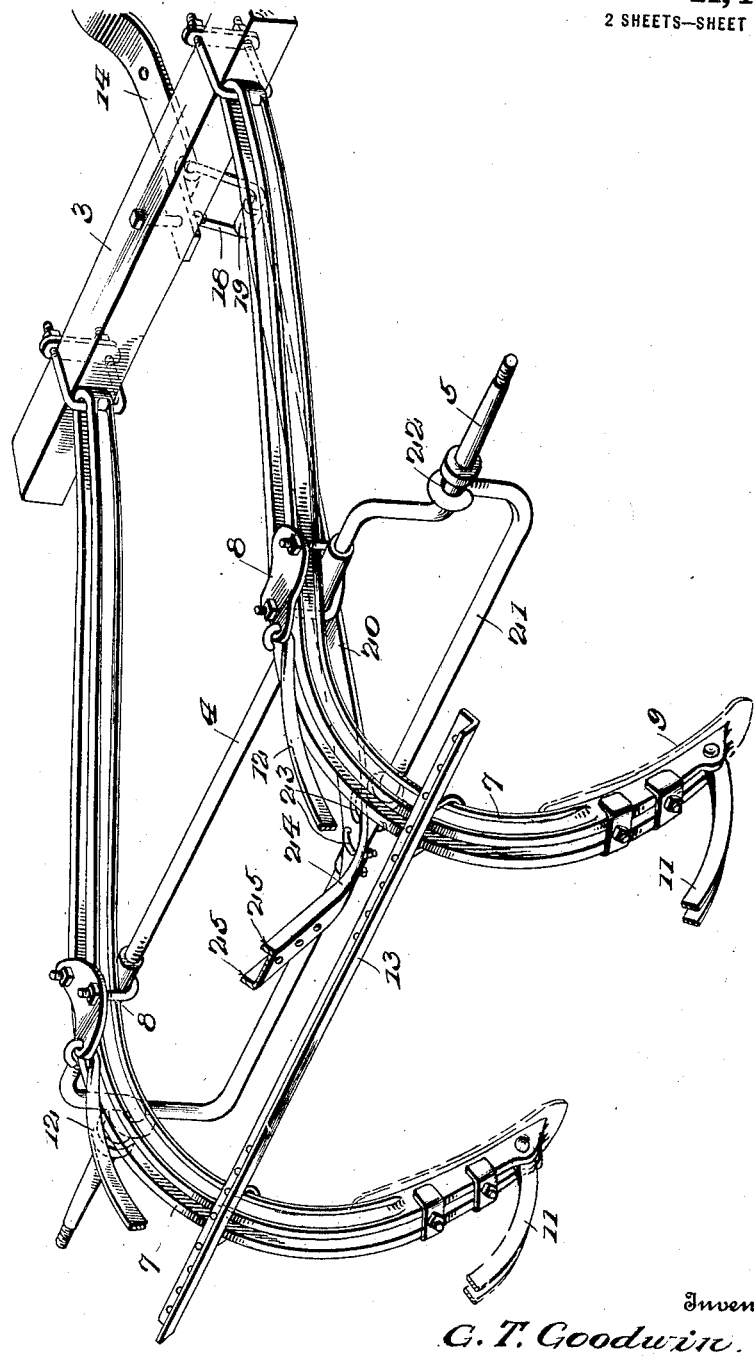

GROVER T. GOODWIN, OF CRAWFORD, COLORADO.

CULTIVATOR.

1,382,422.  Specification of Letters Patent.  Patented June 21, 1921.

Application filed July 19, 1920. Serial No. 397,160.

*To all whom it may concern:*

Be it known that I, GROVER T. GOODWIN, a citizen of the United States, residing at Crawford, in the county of Delta and State of Colorado, have invented certain new and useful Improvements in Cultivators, of which the following is a specification.

This invention relates to agricultural implements and has for its object the provision of means whereby the driver seated upon a wheeled implement may raise or lower the cultivator shovels or other soil-engaging members without being required to raise his own weight and also to provide a seat support which will relieve the draft animals of the weight of the driver. These objects and such other objects as will incidentally appear in the course of the following description are attained in such a device as is illustrated in the accompanying drawings.

In the drawings:—

Figure 1 is a side elevation of a cultivator having my present invention embodied therein, Fig. 2 is an enlarged perspective view of the cultivator beams and the major portion of the seat support.

In carrying out my invention, I employ a frame comprising a draft pole or tongue 1 and hounds 2 secured to the opposite sides of the tongue and diverging rearwardly therefrom, a cross bar or draft beam 3 being secured to the under side of the tongue and the hounds as will be readily understood. The rear ends of the hounds are secured to the arch 4 of an axle 5 which has ground wheels 6 mounted upon its end spindles in the usual manner. Cultivator beams 7 are also connected at their front ends to the draft beam or cross bar 3 and extend rearwardly therefrom over the axle to which they are connected, as shown at 8. In the drawings, I have shown the beams as carrying cultivator shovels or blades 9 at their lower rear ends and markers or spreaders 10 are carried by standards 11 which are connected at their lower ends to the shovels 9 and at their upper ends to supporting arms 12 which extend rearwardly from the couplings 8 by which the beams 7 are connected to the axle. A spacing bar 13 is secured to and extends between the rear portions of the beams 7 so that they will be held in a fixed spaced relation corresponding to the width of the rows which are being cultivated or the lines for which are to be marked.

Secured to the bar 3 at the center thereof and extending forwardly therefrom is a plate or bracket 14 which has its front end rigidly bolted to the draft tongue, as shown at 15, a whiffletree or other draft applying member 16 being mounted between the said bracket or plate and the tongue as will be readily understood on reference to Fig. 1. Immediately adjacent the bar 3, this bracket or plate 14 is constructed with an eye 17 in which is pivotally engaged the upper end of a link 18 which depends from said eye and has its lower end engaged in an eye 19 at the front end of a seat-supporting bar or member 20. This bar or seat-supporting member 20 extends rearwardly over a U-shaped hanger 21 which is pivotally supported at its ends 22 upon the spindles of the axle 5 at the inner sides of the ground wheels so that it may swing freely upon the axle. The bar 20 is secured upon this hanger 21 by clips 23 and immediately in rear of the hanger is bent upwardly, as shown at 24, and provided with forwardly projecting flanges 25 at its edges whereby to form a socket to receive the lower end of the spring seat standard 26, the seat 27 of any preferred form being secured upon the upper end of said seat standard as will be readily understood. The lower end of the standard 26 may be adjusted longitudinally of the upturned portion of the seat-supporting bar so that the driver may be seated comfortably with his feet resting upon the hanger 21.

A hand lever 28 is secured rigidly to the arch 4 of the axle 5 and is equipped with a latch 29 of the usual or any preferred form adapted to coöperate with a segment 30 fixed upon the frame. If this lever be thrown forwardly, the axle will be caused to rock in the hubs of the ground wheels so that it will extend forwardly from said hubs and will, consequently, be lowered so that the soil-engaging members 9 will be brought into working engagement with the earth. If the hand lever be swung rearwardly as shown in Fig. 1, the axle will be raised so that the ground-engaging members will be lifted and the machine may be drawn along a road or from field to field without working.

It will be readily understood that the U-shaped hanger 21 depends from the axle at all times so that the vertical position of the seat-supporting structure is not changed at any time and the link 18 connecting the front end of the member 20 with the tongue or the main frame swings so as to accomodate the movement of the frame without transmitting said movement to the seat-supporting structure. The driver is thus enabled to raise or lower the working members of the implement without being required to raise his own weight, and also, the driver's weight and the weight of the seat support is carried by the axle and not by the tongue so that the draft animals are relieved of the strain due thereto.

My device is exceedingly simple in construction and arrangement and may be manufactured at a low cost. When in use, it will be found highly efficient for the purpose for which it is designed.

Having thus described the invention, what is claimed as new is:

1. In an agricultural implement, the combination with a wheel-supported frame, of a hanger suspended on said frame, a seat-carrying member secured upon said hanger, and a swinging connection between the frame and the front end of said seat-carrying member.

2. In an agricultural implement, the combination of a main frame comprising a draft tongue and a cross beam secured thereto, ground-treating members connected to said cross beam, an arched axle connected to the frame and said members, ground wheels mounted on said axle, means for swinging the axle whereby to raise or lower the ground-engaging members, a hanger suspended on the axle, a seat-supporting bar extending across and secured to said hanger, and a link connecting the front end of said seat-supporting bar with the main frame.

3. In an agricultral implement, the combination with a main frame including an arched axle, of a U-shaped hanger suspended on said axle, a seat-supporting bar extending across said hanger and secured thereto, and a link forming a swinging connection between the front end of said bar and the frame.

In testimony whereof I affix my signature.

GROVER T. GOODWIN. [L. S.]